(12) United States Patent
Steinbrück et al.

(10) Patent No.: US 7,066,488 B2
(45) Date of Patent: Jun. 27, 2006

(54) SIDE GAS BAG AND SIDE GAS BAG MODULE FOR A VEHICLE OCCUPANT PROTECTION DEVICE

(75) Inventors: Olaf Steinbrück, Kretzschau (DE); Andrej Strukelj, Schwäbisch Gmünd (DE); Jürgen Scherr, Waldstetten (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 255 days.

(21) Appl. No.: 10/637,439

(22) Filed: Aug. 8, 2003

(65) Prior Publication Data

US 2004/0032116 A1 Feb. 19, 2004

(30) Foreign Application Priority Data

Aug. 16, 2002 (DE) ............................ 202 12 599 U

(51) Int. Cl.
*B60R 21/233* (2006.01)
(52) U.S. Cl. .................................... 280/729; 280/730.2
(58) Field of Classification Search ................ 280/729, 280/730.2, 743.1, 742
See application file for complete search history.

(56) References Cited

U.S. PATENT DOCUMENTS

| 6,073,961 | A | 6/2000 | Bailey et al. |
| 6,199,898 | B1 * | 3/2001 | Masuda et al. ........... 280/730.2 |
| 6,260,878 | B1 * | 7/2001 | Tanase ..................... 280/730.2 |
| 6,361,067 | B1 | 3/2002 | Varcus et al. |
| 6,371,518 | B1 * | 4/2002 | Kalandek et al. ......... 280/743.1 |
| 6,502,853 | B1 * | 1/2003 | Keshavaraj .................. 280/729 |
| 6,749,216 | B1 * | 6/2004 | Tanase et al. ............. 280/730.2 |
| 6,755,436 | B1 * | 6/2004 | Hess et al. ................ 280/730.2 |
| 2004/0104563 | A1 * | 6/2004 | Fischer ..................... 280/743.1 |

FOREIGN PATENT DOCUMENTS

| DE | 19933836 | 2/2000 |
| DE | 20105734 | 10/2001 |
| WO | 94/19215 | 9/1994 |

OTHER PUBLICATIONS

U.S. Appl. No. 10/473,657, filed Sep. 29, 2003 entitled "Gas Bag Module for a Vehicle Occupant Restraint System".

* cited by examiner

*Primary Examiner*—David R. Dunn
(74) *Attorney, Agent, or Firm*—Tarolli, Sundheim, Covell & Tummino LLP

(57) ABSTRACT

A side gas bag for a vehicle occupant restraint system includes an inflatable volume which is delimited by an exterior gas bag covering (16). There is provided an inflatable pouch (18) in the inflation region of the gas bag (14) inside the gas bag covering (16). There is further proposed a side gas bag module including such side gas bag.

4 Claims, 1 Drawing Sheet

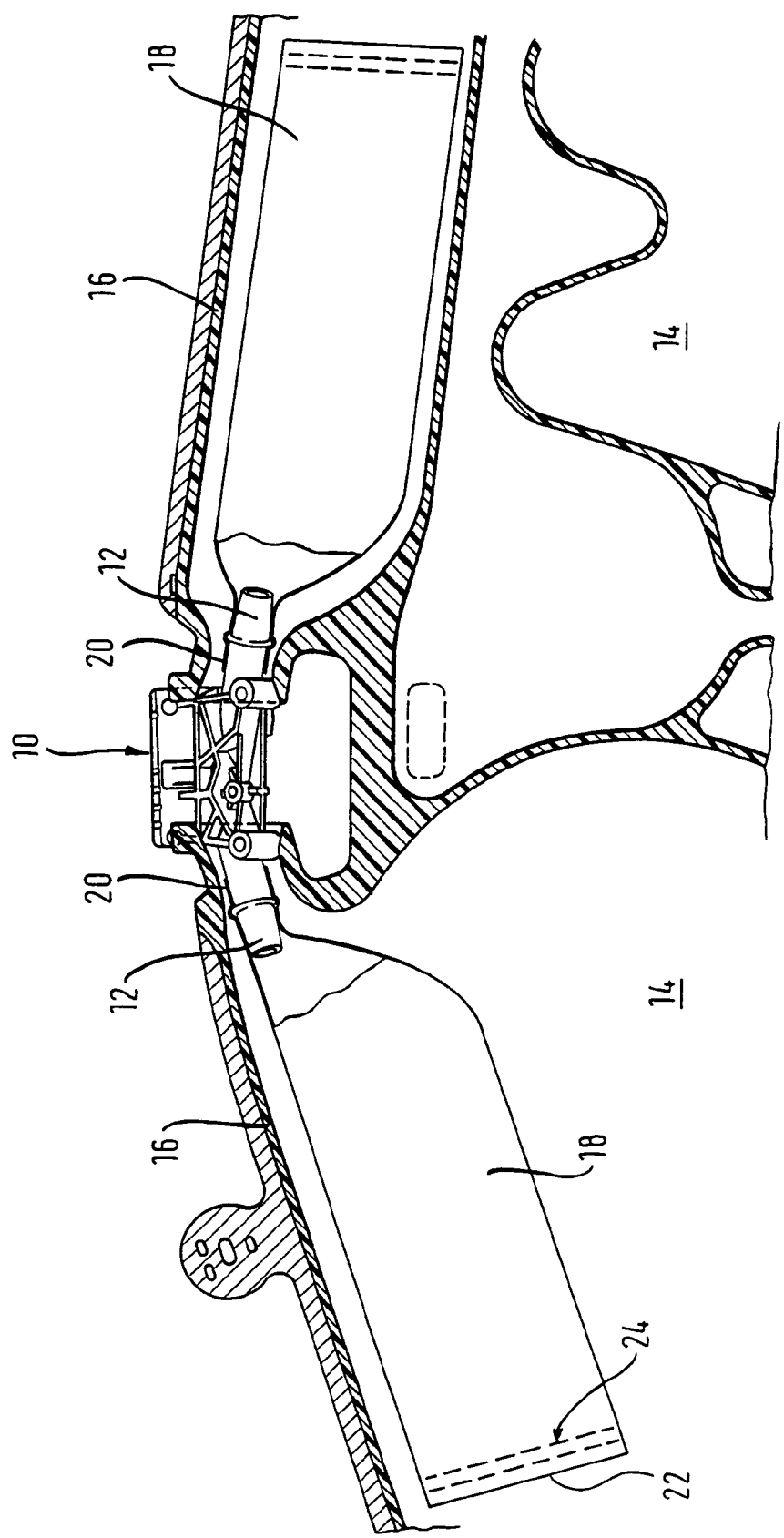

us 7,066,488 B2

SIDE GAS BAG AND SIDE GAS BAG MODULE FOR A VEHICLE OCCUPANT PROTECTION DEVICE

TECHNICAL FIELD

The invention relates to a side gas bag for a vehicle occupant restraint system and to a side gas bag module for a vehicle occupant protection device.

BACKGROUND OF THE INVENTION

The inflatable volume of known gas bags is usually delimited by an exterior gas bag covering. In side gas bags, in particular in side gas bags which are stowed folded in a gas bag module arranged in the region of the roof edge of the vehicle, damage to its inflation orifice can occur during the filling of the gas bag, when the folded package is not pushed apart sufficiently quickly. The damage is due to the initially very high temperatures of the gas provided by a gas generator, and due to the high gas flow.

BRIEF SUMMARY OF THE INVENTION

The invention provides a side gas bag which in particular in the initial stage of unfolding ensures a rapid pushing apart of the folded gas bag package.

According to the invention, a side gas bag for a vehicle occupant restraint system comprises an inflatable volume which is delimited by an exterior gas bag covering. There is provided an inflatable pouch in the inflation region of the gas bag inside the gas bag covering. The pouch serves as an initial unfolding aid for the folded gas bag covering. Through the inflating of the pouch and the expansion entailed thereby, the folded package of the gas bag covering surrounding the pouch is pushed apart in an effective manner in a very short period of time.

According to a preferred embodiment, the pouch has an elongated, tubular shape with a first end constructed as an inflation opening, and a second end constructed as an outflow opening. The inflation opening can be directly connected with an inflation connection, via which the gas provided by a gas generator is conveyed. Therefore, the gas is firstly directed into the pouch, before it flows through the outflow opening into the volume of the gas bag covering and completely unfolds the gas bag.

A specific influence on the inflation behavior of the gas bag is achieved in that the pouch is provided with a tear seam, which tears open at a predetermined internal pressure of the pouch and thereby frees an outflow opening. Thus, it can be ensured that the hot gas is firstly collected in the pouch, before it arrives in cooled form through the previously closed outflow opening into the volume of the gas bag covering. Any possible tears in the inflation region of the gas bag or a burning through are thereby prevented.

The invention further provides a side gas bag module with at least one side gas bag according to the invention. Preferably, the pouch of the side gas bag is connected directly with an inflation connection of the module.

BRIEF DESCRIPTION OF THE DRAWING

The single FIGURE shows a cross-sectional view of a side gas bag module according to the invention, with two side gas bags according to the invention in an unfolded state.

DETAILED DESCRIPTION OF THE PREFERRED EMBODIMENT

In the FIGURE, a so-called center side gas bag module 10 is illustrated, which is arranged in a vehicle on the roof edge in the region of the B-column. The module 10 comprises two inflation connections 12, via which two similar side gas bags 14 are filled with gas. The two gas bags 14 are formed from an outer gas bag covering 16 and an elongated, tubular pouch 18 provided inside the covering 16 in the inflation region of the gas bag 14. The first end 20 of the pouch 18 is turned over the associated inflation connection 12 and is fastened thereon, whereas the second end 22 is closed by a tear seam 24, which can have one or more exhaust openings.

After the activation of the gas generator (not shown), the hot gas provided by it is conveyed under high pressure via the respective inflation connection 12 firstly to the tubular pouches 18 arranged inside the gas bag coverings 16. The pouches 18 therefore receive the first impulse of the gas emerging from the inflation connection 12 and expand. Thereby, the folded packages of the gas bag coverings 16 are rapidly pushed apart.

The tear seam 24 is dimensioned such that after expansion of the pouch 28, it tears open at a predetermined pressure and thus frees an opening of the pouch 18 opposite the inflation connection 12. After the tear seam 24 has opened, the gas, which in the meantime has cooled down slightly, can flow into the volume available through the (already partially unfolded) gas bag covering 16.

In another embodiment, only one gas bag is provided instead of two separate gas bags 14. The two inflation connections 12 in this case can serve to fill different chambers of the gas bag.

The material for the pouch 18 is to be selected according to the respective requirements.

The invention is claimed:

1. A side gas bag for a vehicle occupant restraint system, said side gas bag having an inflatable volume which is delimited by an exterior gas bag covering (16), said side gas bag being provided with an inflatable pouch (18) in an inflation region of said gas bag (14) inside said gas bag covering (16), said pouch (18) having an elongated, tubular shape with opposite first and second end faces (20, 22), said first end face (20) being constructed as an inflation opening, said second end face (22) being constructed as an outflow opening and being provided with a tear seam (24) which tears open at a predetermined internal pressure of said pouch (18) and thereby opens said outflow opening, wherein no gas flows out of said pouch during the inflation of said pouch (18) and before the outflow opening is open.

2. A side gas bag module for a vehicle occupant restraint system, said module (10) comprising at least one side gas bag (14) including an inflatable volume which is delimited by an exterior gas bag covering (16), said side gas bag being provided with an inflatable pouch (18) in an inflation region of said gas bag (14) inside said gas bag covering (16), said pouch (18) having an elongated, tubular shape with opposite first and second end faces (20, 22), said first end face (20) being constructed as an inflation opening, said second end face (22) being constructed as an outflow opening and being provided with a tear seam (24) which tears open at a predetermined internal pressure of said pouch (18) and thereby opens said outflow opening, said module (10) comprising another side gas bag symmetrical with said first mentioned side gas bag (14), said another side gas bag (14) including an inflatable volume which is delimited by an exterior gas bag covering (16), said another side gas bag being provided with an inflatable pouch (18) in an inflation region of said gas bag (14) inside said gas bag covering (16), said pouch (18) of said another side gas bag (14) having an elongated, tubular shape with opposite first and second end faces (20, 22), said first end face (20) of said pouch (18) of said another side gas bag (14) being constructed as an inflation opening, said second end face (22) of said pouch (18) of said another side gas bag (14) being constructed as an outflow opening and being provided with a tear seam (24) which tears open at a predetermined internal pressure of said pouch (18) of said another side gas bag (14) and thereby opens said outflow opening.

3. A side gas bag module for a vehicle occupant restraint system, said module (10) comprising at least one side gas bag (14) including an inflatable volume which is delimited by an exterior gas bag covering (16), said side gas bag being provided with an inflatable pouch (18) in an inflation region of said gas bag (14) inside said gas bag covering (16), said pouch (18) having an elongated, tubular shape with opposite first and second end faces (20, 22), said first end face (20) being constructed as an inflation opening, said second end face (22) being constructed as an outflow opening and being provided with a tear seam (24) which tears open at a predetermined internal pressure of said pouch (18) and thereby opens said outflow opening, wherein no gas flows out of said pouch (18) during the inflation of said pouch (18) and before the outflow opening is open.

4. A side gas bag for a vehicle occupant restraint system, said side gas bag having an inflatable volume which is delimited by an exterior gas bag covering (16), said side gas bag being provided with an inflatable pouch (18) in an inflation region of said gas bag (14) inside said gas bag covering (16), said pouch (18) having an elongated, tubular shape with opposite first and second end faces (20, 22), said first end face (20) being constructed as an inflation opening, said second end face (22) being constructed as an outflow opening and being provided with a tear seam (24) which tears open at a predetermined internal pressure of said pouch (18) and thereby opens said outflow opening, wherein the gas of said pouch only flows out of the outflow opening.

* * * * *